US006622428B2

(12) United States Patent
White, II et al.

(10) Patent No.: US 6,622,428 B2
(45) Date of Patent: Sep. 23, 2003

(54) METHOD FOR CONTAINING ORGANIC DEBRIS

(75) Inventors: Locke White, II, 501 8th St., Radford, VA (US) 24241; Keith John Jones, Blacksburg, VA (US)

(73) Assignee: Locke White, II, Radford, VA (US)

(*) Notice: Subject to any disclaimer, the term of this patent is extended or adjusted under 35 U.S.C. 154(b) by 0 days.

(21) Appl. No.: 09/783,927

(22) Filed: Feb. 14, 2001

(65) Prior Publication Data

US 2001/0032414 A1 Oct. 25, 2001

Related U.S. Application Data

(60) Provisional application No. 60/182,414, filed on Feb. 14, 2000.

(51) Int. Cl.$^7$ .............................................. C09K 17/00
(52) U.S. Cl. ............................... 47/58.1 SC; 405/129.9; 427/421; 156/326
(58) Field of Search ...................... 405/129.9; 427/421; 47/58.1 R, 58.1 SC, 9; 156/326

(56) References Cited

U.S. PATENT DOCUMENTS

| | | | |
|---|---|---|---|
| 1,995,853 A | | 3/1935 | Hunsaker |
| 2,197,929 A | | 4/1940 | Hale |
| 2,768,896 A | | 10/1956 | Lewis |
| 3,485,635 A | | 12/1969 | Fassauer |
| 4,366,949 A | | 1/1983 | Staub |
| 4,540,586 A | | 9/1985 | Moore |
| 4,686,790 A | * | 8/1987 | Lahalih et al. ............... 47/9 |
| 4,859,480 A | | 8/1989 | Macfarlane |
| 5,120,362 A | | 6/1992 | Kauffman |
| 5,266,353 A | | 11/1993 | Kauffman |
| 5,300,127 A | * | 4/1994 | Williams .................. 47/57.6 |
| 5,417,462 A | | 5/1995 | Hensley |
| 5,441,877 A | * | 8/1995 | Chiaffredo et al. ......... 435/176 |
| 5,514,191 A | * | 5/1996 | Miller et al. ................. 47/1.1 |
| 5,525,009 A | * | 6/1996 | Hansen ..................... 405/129.9 |
| 5,573,829 A | * | 11/1996 | Decker ..................... 428/156 |
| 5,579,610 A | | 12/1996 | Jackson |
| 5,849,364 A | * | 12/1998 | Nachtman et al. ........ 427/421 |
| 5,953,857 A | * | 9/1999 | Aiga et al. ................... 47/29.4 |
| 6,024,416 A | * | 2/2000 | Chen et al. ................ 301/121 |
| 6,054,519 A | * | 4/2000 | Jakob et al. ............... 524/354 |
| 6,096,373 A | * | 8/2000 | Nachtman et al. ........ 427/136 |
| 6,435,770 B1 | * | 8/2002 | Shi ........................ 405/129.9 |

FOREIGN PATENT DOCUMENTS

| | | | | |
|---|---|---|---|---|
| JP | 58015056 A | * | 1/1983 | .......... C04B/13/24 |
| JP | 06305919 A | * | 11/1994 | .......... A01N/57/16 |

OTHER PUBLICATIONS

Mulching for a Healthy Landscape, Diane Relf, Extension Specialist, Environmental Horticulture, Virginia Tech Publication No. 26–724 found at: www.ext.vt.edu/pubs/envirohort/426–724/426–724.html.

* cited by examiner

*Primary Examiner*—Charles T. Jordan
*Assistant Examiner*—Susan C Alimenti
(74) *Attorney, Agent, or Firm*—Schwartz Law Firm, P.C.

(57) ABSTRACT

A method of containing organic debris such as leaves in piles or layers is disclosed. The method comprises the utilization of a chemical composition for coating the generally upward facing leaves in order to bond them together into larger sections. Once the separate leaves are bonded together by the coating, the larger sections provide a protective covering that keeps the wind from disturbing the pile or layer. Further, in some instances the coating may include a biological agent that facilitates the decomposition of the organic debris. In other instances the coating may also include a fertilizer that would be beneficial if the organic debris was used as mulch spread around plants. Also disclosed are methods for applying coating using a distributing device.

8 Claims, No Drawings

METHOD FOR CONTAINING ORGANIC DEBRIS

This application claims the benefit of Provisional Application Ser. No. 60/182,414, filed Feb. 14, 2000.

CROSS-REFERENCE TO RELATED APPLICATIONS

Not Applicable

BACKGROUND OF THE INVENTION

This invention relates to a method of containing yard debris in piles or layers.

Every autumn trees drop their leaves and homeowners must remove them or risk harm to their grass and other plants. Blowing leaves also increase likelihood of accidents by obscuring hazards and reducing traction. Leaves may also cause blockage of drainage resulting in flooding. In many municipalities public works crews drive through the neighborhoods and vacuum these leaves up for disposal if the homeowner rakes them into piles at the roadside. Often there are several days of delay between the time the leaves are piled at the roadside and when the crews picks them up. Blustery weather and the wind from passing cars can redistribute the leaves. The homeowner then has to rake the leaves together in piles again. This frustrating process often occurs over and over sometimes two and three times until the leaves are finally removed.

Many things have been tried to keep the leaves in piles including covering them with old bedspreads and tarps. It is frequently a difficult task to spread out the tarps properly over the entire pile because they are often too small and the wind blows them off before they can be weighted down with something. The old bedspreads and tarps covering the piles also create an ugly eyesore that most homeowners would rather not have spread out in front of their house.

There have been several inventions to aid homeowners in the collection and containment of leaves such as U.S. Pat. No. 4,366,949 to Staub, U.S. Pat. No. 5,579,610 to Jackson, and U.S. Pat. No. 5,417,462 to Hensley. All of these inventions have relied on an expensive and cumbersome netting or fabric covering that has to be spread out and then weighted or staked down. Not only are these inventions difficult to operate but the covering apparatus creates an eyesore. All the inventions to contain leaves and other yard debris heretofore known suffer from a number of disadvantages.

BRIEF SUMMARY OF THE INVENTION

Briefly, in accordance with the present invention, an adhesive layer is applied to the surface of piles or layers of organic debris, such as, for example, autumn leaves. The adhesive layer binds together a layer of organic debris and holds the pile or layer in place. The adhesive layer may include functional additives such as fertilizer or live biological organisms to increase the rate of decay of the leaves and to increase the value of the resulting leaf mould.

DETAILED DESCRIPTION OF THE INVENTION

This invention is a method for containing organic debris is comprised of an adhesive layer applied to the outside of a pile or layer of organic debris. In the preferred embodiment the adhesive layer is biodegradable and non-toxic to plants and animals so that when organic debris is dumped in a landfill or used as mulch it does not pollute the soil or harm plants and animals. For optimum results, the adhesive layer would be made of all natural components, the adhesive would be derived from animal and vegetable materials that would also be friendly to the environment. The adhesive layer could come in the form of a powder or foam or as two parts whereby another component would be added such as water. One embodiment is a mixture by volume of: 2% ground psyllium husk; 33% denatured alcohol that acts as a suspending agent; and 65% water. The water would either be mixed with the powder in a bottle, in a hose attachment similar to lawn fertilizer sprayers or after the powder had first been sprinkled on leaves. The adhesive layer could include one or more additives such as; a biological agent that would accelerate the decomposing process of the yard debris, a fertilizing agent that would be beneficial to plants if the yard debris was used as a mulch spread around plants, a coloring agent so that when a person was distributing it over leaves they would know if the pile had been adequately covered. The adhesive layer, after drying, would be a non-gumming solution that would not damage the vacuuming equipment used to remove leaves from the side of the road.

The adhesive layer may be distributed with various equipment, for example, the distributing device is a pump spray bottle similar to the ones used with consumer cleaning solutions. The nozzle on the distributing device can be adjusted to spray a stream or a wide pattern and is non-clogging. In other embodiments the distributing device could be a can with wide holes to effectively distribute a powdered version of coating, or it could be a can under pressure to distribute an aerosol or foam version of coating. In other embodiments the distributing device could be a garden pump sprayer commonly used by homeowners to distribute herbicides. In other embodiments distributing device could be an industrial sprayer commonly used to distribute grass seed along highways. In still further embodiments the distributing device could be a lawn-fertilizing sprayer that includes a bottle that attaches on a garden hose (nozzle end sprayer such as the Ortho Dial'n Spray®) that would mix a powder or liquid concentrate with water as coating was sprayed on leaves. As the adhesive layer dries, leaves and other debris are bonded together into one piece so that blowing wind and passing cars cannot remove the large top layer and redistribute the pile. In other embodiments, the adhesive could come in the form of a powder that would be first sprinkled over leaves and then moistened with water that would begin the bonding of all loose leaves into one solid top component. The adhesive could also come with a coloring agent that would show the user that the entire pile of leaves had been adequately covered. In other embodiments, the adhesive could be distributed as mentioned above however, as it dries it would form a hard coat over leaves like paint on any surface. The aerodynamic qualities, shape and mass of coating would keep leaves in place in a pile or a few heavy objects like rocks could be placed on the pile.

One embodiment of the invention is to apply the adhesive layer to organic debris to control the movement of the organic debris from where the decomposition of the debris is advantageous. For example, autumn leaves may be blown by gas or electric powered leaf blowers from golf turf areas or home lawns into natural area and then treated with an adhesive layer. The adhesive layer would ensure the leaves do not get blown around. The decomposition of the leaves will enhance desirable soil characteristics (increased water retention, decreased erodability, reduction of weedy under story growth, increased health of desirable vegetation). The advantages of mulching is well know, see, for example, Mulching for a Healthy Landscape, Diane Relf, Virginia Tech Publication Number 426-724. This would also result in golfers being able to find errant golf balls more quickly.

Another embodiment of the invention is to apply an adhesive layer to autumn leaves arranged in a doughnut shape around the base of a tree. The adhesive layer would ensure the leaves do not get blown around. The decomposition of the leaves will enhance desirable soil characteristics (increased water retention, decreased erodability, and reduction of weedy under story growth, with resulting increased health of desirable vegetation. The leaves act as a barrier to plant growth from beneath the doughnut structure thus making lawn maintenance easier.

Addition of live biological organisms, including but not limited to Bacillus sp., Pseudomonas sp., Trichoderma sp., Erwinia sp., Pichia sp., Candida sp., Cryptococcus sp., Talaromyces sp., *P. fumosoreus, B. bassiana,* Chaetomium sp., Gliocladium sp., Aureobasidium sp., Dabaryomyces sp., Exophilia sp., Ampelomyces sp., and Mariannaea sp will result in faster leaf breakdown accelerating removal of leaves and increase the benefits of leaf breakdown listed above. BIO•Bplus™ a product of GreenReleaf™ by Sybron is a commercially produced example of a mixture of bacteria specifically selected to speed breakdown of organic debris in lawns. The biological organisms may also be nitrogen-fixing organisms such as certain members of the cyano-bacteria that would result in natural nitrogen fixation and increased health of the plant community. One embodiment of the subject invention is to select for biological agents that are tolerant to and thus well suited to a use in the adhesive layer.

Organic debris may be leaves resulting from autumn or other seasonal leaf fall, leaves and other yard debris (leaves, flowers, stems, fruits) resulting from yard activities. Yard activities may be, for example, cultivation, cutting, herbicide application, or withholding of irrigation water.

The adhesive may contain one or more constituents such as surface-active agents and other ingredients. As examples for a surface-active agent, alkylsulfate esters, alkylsulfates, alkylarylethers and their polyoxyethylenes, polyethyleneglycols, polyhydric alcohol esters, and sugar alcohol derivatives can be given. As examples for other ingredients for the adhesive, a sticking agent and a dispersant, such as casein, gelatin, polysaccharides including starch, gum arabic, cellulose derivatives and alginic acid, lignin derivatives, bentonite and synthetic aqueous polymers including polyvinyl alcohol, polyvinyl pyrrolidone and polyacrylic acid, and a stabilizer, such as PAP (acidic isopropyl phosphate), BHT (2,6-di-tert-butyl-4-methylphenol), BHA (2-/3-tert-butyl-4-methoxyphenol), vegetable oils, mineral oils, fatty acids and fatty acid esters, can be given. Examples of adhesives and binding agents are Agar, Alginates, Amine Oxides, Cocamidopropyl Hydroxysultaine, Coco Amido Betaine, Coconut Diethanolamide, Corn Starch, Cotton fibres, Dextrin, Diatomaceous Earth, Dihydroxyethyl Tallow Glycinate, Ethylcellulose, Gellan Gum, Guar, Hydroxy Methyl Cellulose, Hydroxyethyl Cellulose, Hydroxypropylmethylcellulose, Lauric Diethanolamide, Methylcellulose, Polyvinyl Alcohol, Primary Alcohol Ethoxylates, Sodium Carboxymethylcellulose, Xanthan Gum.

The adhesive layer may include a plant fertilizer containing the plant macronutrients Nitrogen, Potassium and Phosphorus or a complete fertilizer including the macro and micro plant nutrients as exemplified by Miracle Gro® (The Scotts Company) or may be customized for specific applications.

The following examples illustrate the practice of the present invention and should not be construed as limiting its scope.

EXAMPLE 1

A solution was made with: 2% psyllium husk; 33% denatured alcohol; and 65% water. This created a solution with an adequately high solid content of the polymer and a low viscosity enabling it to be sprayed in a wide pattern by a common pump bottle sprayer found with consumer cleaning products. Using other concentrations of the ingredients in other experiments, the solution was found to have either too high of a viscosity to be sprayed through the pump sprayer or too little concentration of the polymer to adequately hold the leaves together.

Using the solution with the ratio noted above and a common pump bottle sprayer, an even layer was sprayed on a small pile of maple leaves. In approximately two hours the solution had dried and a small house fan was directed on the pile of leaves at various speeds. The dried layer of the solution kept the leave from being blown out of the pile no matter what speed the fan was turned on.

EXAMPLE 2

A second experiment was conducted using a solution of: 75% polyvinyl acetate; and 25% water. Again using these ingredients in other experiments there was the same problem as noted above in finding a proper solution ratio that would hold the leaves in place and that could also be distributed by using a pump bottle sprayer.

Using the solution with the ratio of 75% polyvinyl acetate and 25% water, a thorough layer was sprayed on another pile of maple leaves. Once the solution had dried in approximately two hours a house fan was pointed at the leaves. Again this dried solution kept the leaves in one place.

EXAMPLE 3

The adhesive solution of example 1. is amended with Miracle Gro™ a product of The Scotts Company. Application to naturally dehisced maple leaves in a natural area results in a lower rate of leaf redistribution and a faster rate of decay than untreated leaves. Rate of leaf decay is measured by enclosing treated or untreated leaves in bags made of plastic window screen material, putting bags in a natural area under the maple trees and measuring the dry weight of leaf material in the spring. The treated leaves weigh significantly less than the untreated.

EXAMPLE 4

The adhesive solution of example 1 is amended with the recommended rates of BIO•Bplus™ a product of GreenReleaf™ by Sybron. Application to naturally dehisced maple leaves in a natural area results in a lower rate of leaf redistribution and a faster rate of decay than untreated leaves. The data are collected as in Example 3.

It should be understood that the examples and embodiments described herein are for illustrative purposes only and that various modifications or changes in light thereof will be suggested to persons skilled in the art and are to be included within the spirit and purview of this application and the scope of the appended claims.

We claim:

1. A method for substantially containing fallen leaves gathered in a pile at a temporary collection site for subsequent removal, said method comprising the step of distributing an adhesive over a top surface of the leaf pile, the adhesive acting to bind a number of the leaves together in a manner sufficient to substantially contain the leaves in the gathered pile, and after distributing the adhesive over the gathered leaf pile, removing the leaves from the temporary collection site.

2. A method according to claim 1, wherein the step of distributing the adhesive comprises using a handheld sprayer to spray an adhesive solution over the top surface of the leaf pile.

3. A method according to claim 1, wherein the step of distributing the adhesive comprises sprinkling a dry adhesive powder over the top surface of the leaf pile, and then wetting the power to activate the adhesive.

4. A method for substantially containing fallen leaves gathered in a pile at a temporary collection site for subsequent removal, said method comprising the steps of:
   (a) providing an adhesive solution adapted for being applied to the leaf pile in a liquid state using a handheld spray device; and
   (b) distributing the adhesive solution from the handheld spray device over a top surface of the leaf pile, whereby the adhesive solution acts to bind a number of the leaves together in a manner sufficient to substantially contain the leaves in the gathered pile; and
   (c) after distributing the adhesive over the gathered leaf pile, removing the leaves from the temporary collection site.

5. A method according to claim 4, wherein the adhesive solution comprises a coloring agent.

6. A method according to claim 4, wherein the adhesive solution comprises a fertilizing agent.

7. A method according to claim 4, wherein the handheld sprayer comprises a handheld pump sprayer with an adjustable spray nozzle.

8. A method according to claim 4, wherein the handheld sprayer comprises a hose-end attachment sprayer adapted for being attached to a free end of a garden hose.

* * * * *